(12) United States Patent
Mizuno

(10) Patent No.: US 12,197,154 B2
(45) Date of Patent: Jan. 14, 2025

(54) IMAGE FORMING APPARATUS AND IMAGE FORMING METHOD INCLUDING PREVIEW AND PRE-HEATING FEATURES

(71) Applicant: BROTHER KOGYO KABUSHIKI KAISHA, Nagoya (JP)

(72) Inventor: Yusuke Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/146,750

(22) Filed: Dec. 27, 2022

(65) Prior Publication Data

US 2023/0205117 A1 Jun. 29, 2023

(30) Foreign Application Priority Data

Dec. 28, 2021 (JP) .................. 2021-214857

(51) Int. Cl.
*G03G 15/20* (2006.01)
*G03G 15/00* (2006.01)
*H04N 1/00* (2006.01)

(52) U.S. Cl.
CPC ........ *G03G 15/205* (2013.01); *G03G 15/5016* (2013.01); *H04N 1/00161* (2013.01); *H04N 1/0044* (2013.01); *G03G 15/5008* (2013.01); *G03G 2215/2038* (2013.01)

(58) Field of Classification Search
CPC ............. G03G 15/2039; G03G 15/205; G03G 15/5016; G03G 2215/2038; B41J 29/18; H04N 1/00161; H04N 1/0044

USPC ...................................... 399/69, 81
See application file for complete search history.

(56) References Cited

U.S. PATENT DOCUMENTS

| | | | |
|---|---|---|---|
| 7,057,141 B1 * | 6/2006 | Moy ................... | G03G 15/2039 355/405 |
| 10,698,349 B1 * | 6/2020 | Katsumata ......... | G03G 15/2039 |
| 2013/0314724 A1 * | 11/2013 | Tamura ................ | H04N 1/3875 358/1.2 |
| 2016/0098237 A1 * | 4/2016 | Nakatsu ............. | H04N 1/00204 358/1.15 |
| 2021/0191295 A1 | 6/2021 | Tajiri et al. | |
| 2022/0321706 A1 * | 10/2022 | Ito ......................... | G06F 3/1256 |

FOREIGN PATENT DOCUMENTS

JP 2021-099441 A 7/2021

* cited by examiner

*Primary Examiner* — Robert B Beatty
(74) *Attorney, Agent, or Firm* — Merchant & Gould P.C.

(57) ABSTRACT

There is provided an image forming apparatus and method, in which performed are reading an image of an original document, converting a read image to raster data, raising a temperature of a fixing device to a fixing temperature, after raising the temperature of the fixing device, recording an image on the sheet on a sheet and causing the fixing device to fix the developing agent image onto the sheet. When a preview setting is enabled, after performing the converting, the preview image is displayed on the display and the raising is performed after the displaying and in response to an execution instruction of the forming. When the preview setting is not enabled, after performing a pre-heating of the fixing device so that the temperature of the fixing device is lower than the fixing temperature, performing the raising without displaying the preview image.

2 Claims, 13 Drawing Sheets

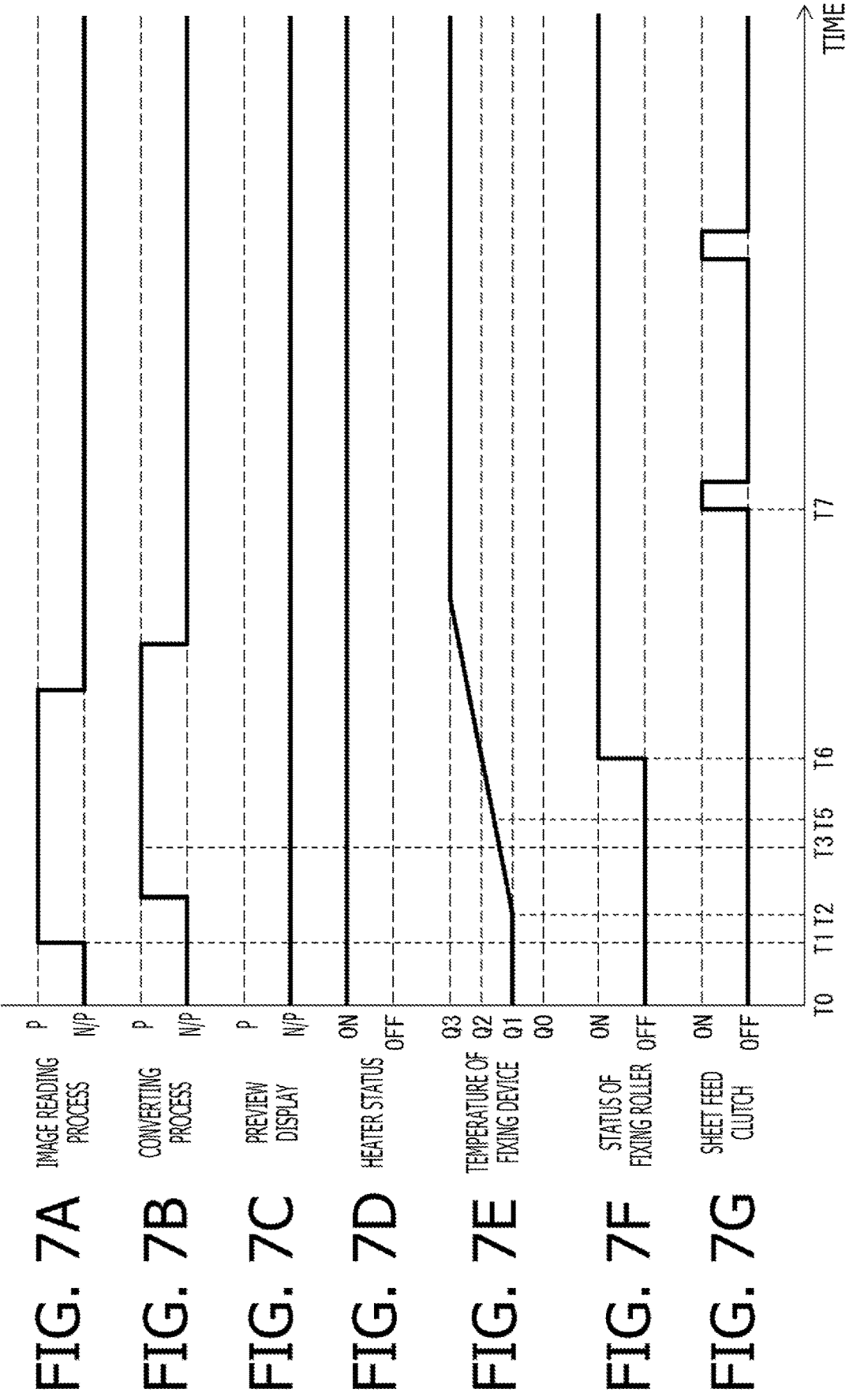

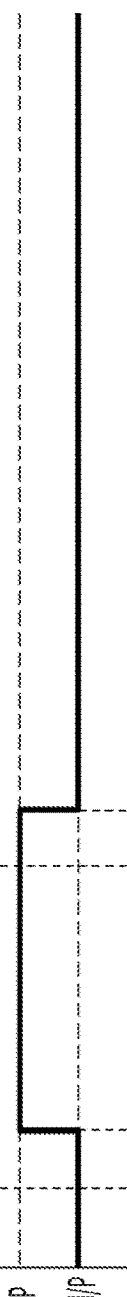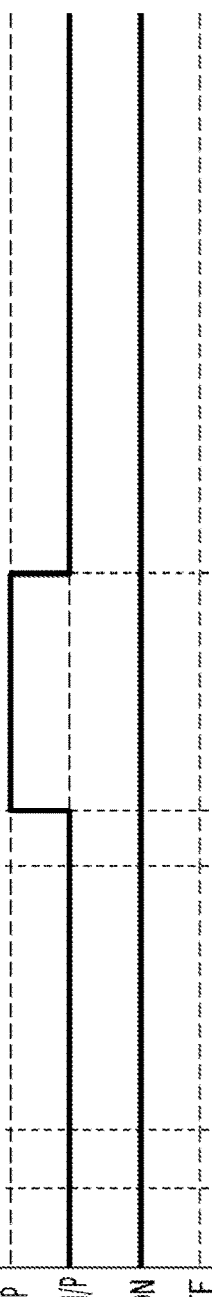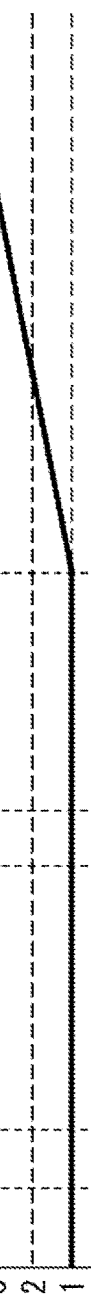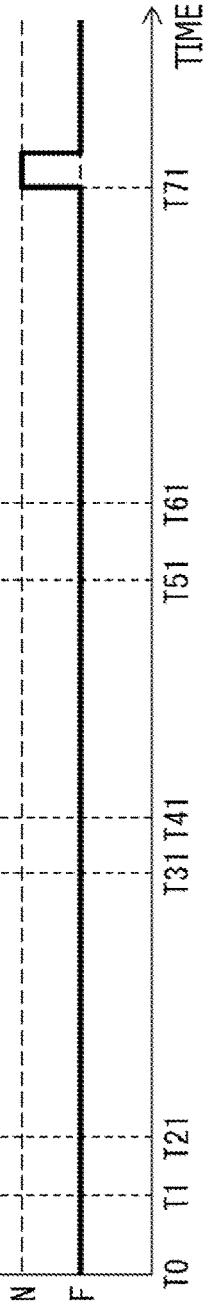

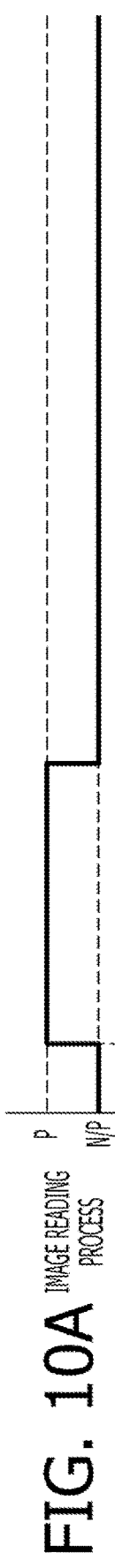
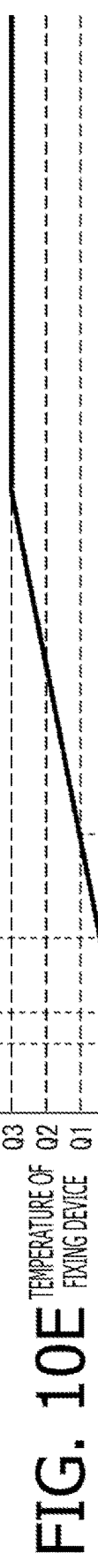

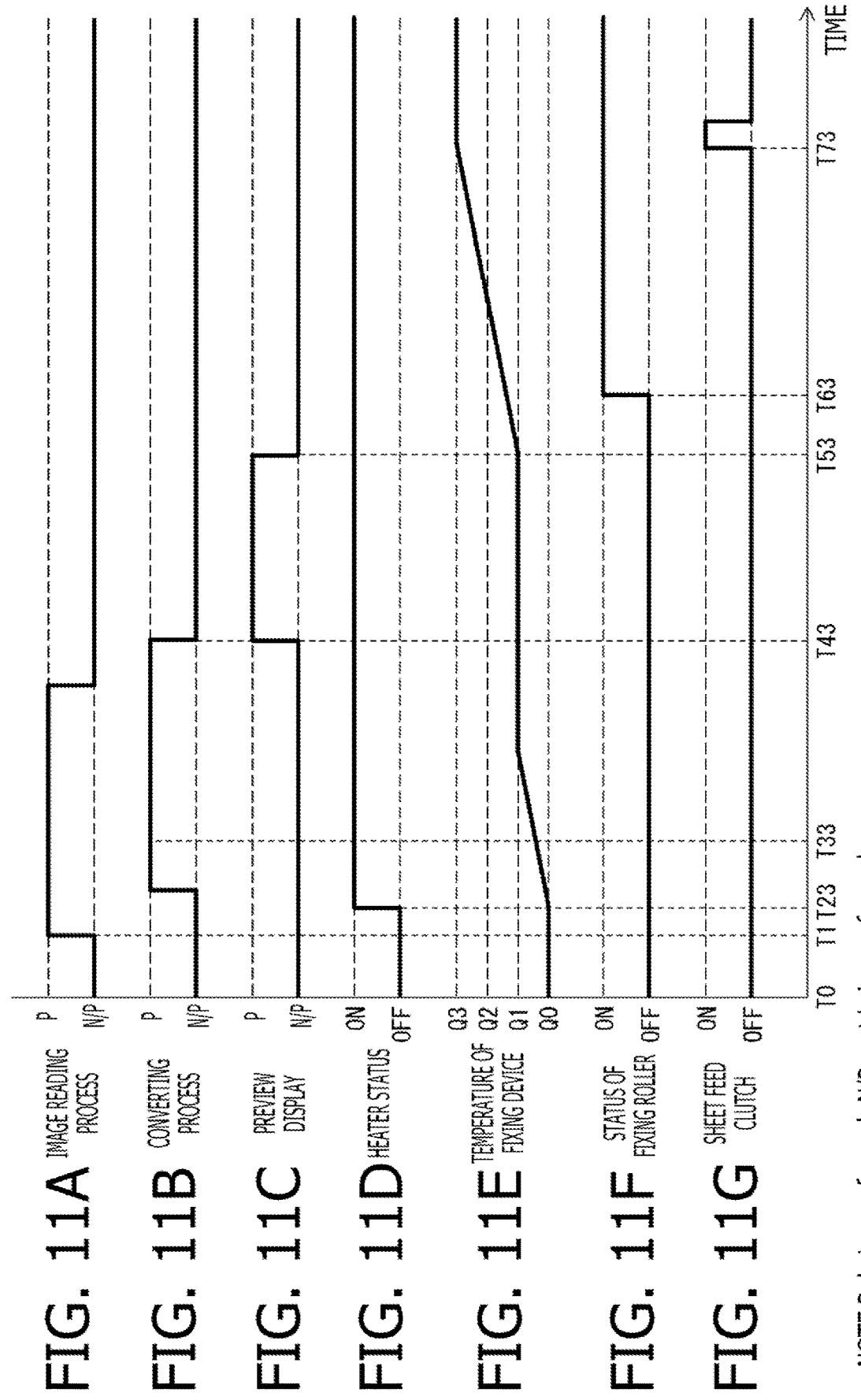

IMAGE FORMING APPARATUS AND IMAGE FORMING METHOD INCLUDING PREVIEW AND PRE-HEATING FEATURES

REFERENCE TO RELATED APPLICATIONS

This application claims priority from Japanese Patent Application No. 2021-214857 filed on Dec. 28, 2021. The entire content of the priority application is incorporated herein by reference.

BACKGROUND ART

The present disclosures relate to an image forming apparatus having a scanner, and to an image forming method.

An electrophotographic image forming apparatus provided with a fixing device including a heater has been known. Typically, in such an image forming apparatus, a developing process to develop print data is started after receiving a print command. Further, after receiving the print command, the heater is turned on so that a fixing process can be performed immediately when the developed image is printed. However, there could be a case where the developing process is not completed after a particular time period has elapsed (such a situation will be referred to as a "timeout") since the heater was turned on. To deal with such a situation, there has been conventionally known an image forming apparatus in which the heater is turned off when the developing process is not completed after a particular time period has elapsed since the heater was turned on so that the fixing device will not be kept heated for a long period of time.

DESCRIPTION

If the above-mentioned image forming apparatus has a preview function to display a preview image before the printing is performed, and if the above-mentioned "timeout" has occurred when the preview image is being displayed, the heater is turned off in the middle of heating the fixing device, which results in unnecessary heating of the fixing device.

According to aspects of the present disclosures, there is provided an image forming apparatus, having a conveyer having a sheet conveying roller configured to convey a sheet, an image formation engine configured to form a developing agent image on the sheet conveyed by the conveyer, a fixing device having a heater configured to apply heat to the sheet, the fixing device being configured to fix the developing agent image on the sheet, a sensor assembly configured to read an image on an original document, a display device configured to display an image, and a controller including hardware. The controller is configured to perform reading an image of the original document with the use of the sensor assembly, converting a read image read by the sensor assembly in the reading to raster data, raising the temperature of the fixing device so that the temperature is a fixing temperature to fix the image onto the sheet, forming the developing agent image on the sheet with the image formation engine after performing the raising, and fixing the developing agent image on the sheet with the fixing device. Further, when a preview setting to display a preview image that corresponds to the read image on the display is enabled, after performing the converting, the controller is configured to perform displaying the preview image on the display and the raising after the displaying and in response to an execution instruction of the forming, and when the preview setting is disabled, after performing a pre-heating of the heater to heat the fixing device to a temperature lower than the fixing temperature, the controller is configured to perform the raising without displaying the preview image.

According to the above configuration, when the preview setting is enabled, the pre-heating is not performed. Accordingly, the heater is prevented from being heated unnecessarily, thereby reducing power consumption. On the other hand, when the preview setting is disabled, the pre-heating is performed and then the heating is performed subsequently. Accordingly, a time period for the heating can be shortened, thereby the FCOT being shortened.

According to the above configuration, in a case where the image forming apparatus operates in the ready mode and when the preview mode is enabled, the temperature of the fixing device is maintained to the first preparation temperature when the converting and displaying are performed. Therefore, the fixing device is prevented from being heated by the heater unnecessarily. On the other hand, in a case where the image forming apparatus operates in the ready mode and when the preview setting is disabled, the heater is pre-heated in the pre-heating so that the temperature of the heater is a second preparation temperature, and immediately after the conversion for the first page has been completed, the heating is executed, thereby FCOT being shortened definitely.

According to the above configuration, when the image forming apparatus operates in the sleep mode and the preview setting is enabled, the temperature of the fixing device is maintained at the first preparation temperature. Therefore, the fixing device is prevented from being heated by the heater unnecessarily. On the other hand, when the image forming apparatus operates in the sleep mode and the preview setting is disabled, the heating is performed after the temperature of the fixing device is raised, by the pre-heating, to the first preparation temperature. In this way, the time period for the heating can be shortened, and the FCOT can be shortened.

According to the above configuration, when the image forming apparatus operates in the sleep mode and the preview setting is disabled, by starting the heating at a timing when the temperature of the fixing device reaches the first preparation temperature in the pre-heating, the FCOT can be shortened.

According to the above configuration, when the converting for the first page has not been completed after a particular time period (e.g., ten seconds) has elapsed since the converting was started, the setting temperature of the heater is changed from the second preparation temperature to the first preparation temperature. In this way, the fixing device is prevented from being heated unnecessarily, and power consumption is reduced.

According to the above configuration, the roller is rotated in a state where the temperature of the heater is set to the fixing temperature. Therefore, the temperature of the fixing device can be raised efficiently, and the temperature of the fixing device can be raised to the fixing temperature before the sheet reaches the fixing device.

According to aspects of the present disclosures, there is provide an image forming method, including reading an image of an original document, converting a read image read in the image reading to raster data, raising a temperature of a fixing device to a fixing temperature to fix the image onto a sheet, after raising the temperature of the fixing device, recording an image on the sheet by forming a developing agent image with an image formation engine on the sheet and causing the fixing device to fix the developing agent image onto the sheet. When a preview setting to display a preview image that corresponds to the read image on the display is enabled, after performing the converting, the method performs displaying the preview image on the display and performing the raising after the displaying and in response to an execution instruction of the forming, and when the preview setting is not enabled, after performing a pre-heating of the fixing device so that the temperature of the fixing device is lower than the fixing temperature, the method performs the raising without displaying the preview image.

According to the above configuration, when the preview setting is enabled, the pre-heating is not performed. Accordingly, the heater is prevented from being heated unnecessarily, thereby reducing power consumption. On the other hand, when the preview setting is disabled, the pre-heating is performed and then the heating is performed subsequently. Accordingly, a time period for the heating can be shortened, thereby the FCOT being shortened.

FIGS. 7A-7G show a timing chart illustrating operations of respective components of the MFP when the preview display is disabled.

FIGS. 8A-8G show a timing chart illustrating operations of respective components of the MFP when the preview display is enabled.

FIGS. 10A-10G show a timing chart illustrating operations of respective components of the modified MFP when the preview display is disabled.

FIGS. 11A-11G show a timing chart illustrating operations of respective components of the modified MFP when the preview display is enabled.

Figure 1:
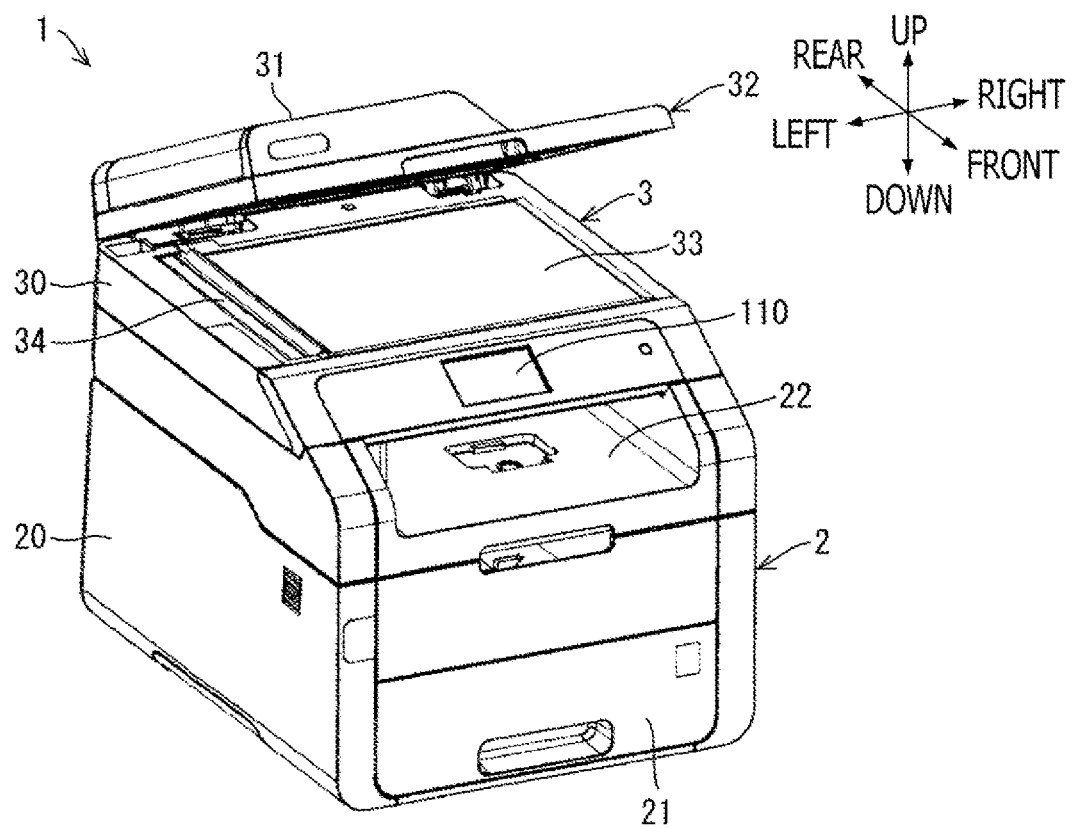
FIG. 1 is a perspective view of an MFP (multi-function peripheral) according to the present disclosures.

Hereinafter, referring to FIGS. 1-3, 4A-4B, 5-6, 7A-7G and 8A-8G, an MFP (multi-function peripheral) 1 according to the present disclosures will be described. FIG. 1 is a perspective view showing an appearance of the MFP 1. The MFP 1 shown in FIG. 1 is an example of an image forming apparatus according to aspects of the present disclosures, and is provided with a printing function, a copying function, a scanning function and a facsimile function. It is noted that the image forming apparatus is not necessarily limited to an MFP having all the functions described above, but may be one which, for example, does not have the facsimile function. In the following description, up and down directions, front and rear directions and right and left directions of the MFP 1 are defined as indicated by arrows in FIGS. 1 and 2.

The MFP 1 has a printer 2 and a scanner 3. The printer 2 has the printing function to form an image on a sheet P. The scanner 3 has the scanning function to scan (a term "read" will also be used in the following description) an image formed on an original document (hereinafter, an image scanned by the scanning function being referred to as a scanned image) and generate image data (hereinafter, the image data representing the scanned image being referred to as scan data).

An image forming method employed by the printer 2 is an electrophotographic method. The printer 2 may be configured to form both color images and monochromatic images, or only monochromatic images. The scanner 3 may be configured to read both color and monochromatic images or only monochromatic images.

Figure 3:
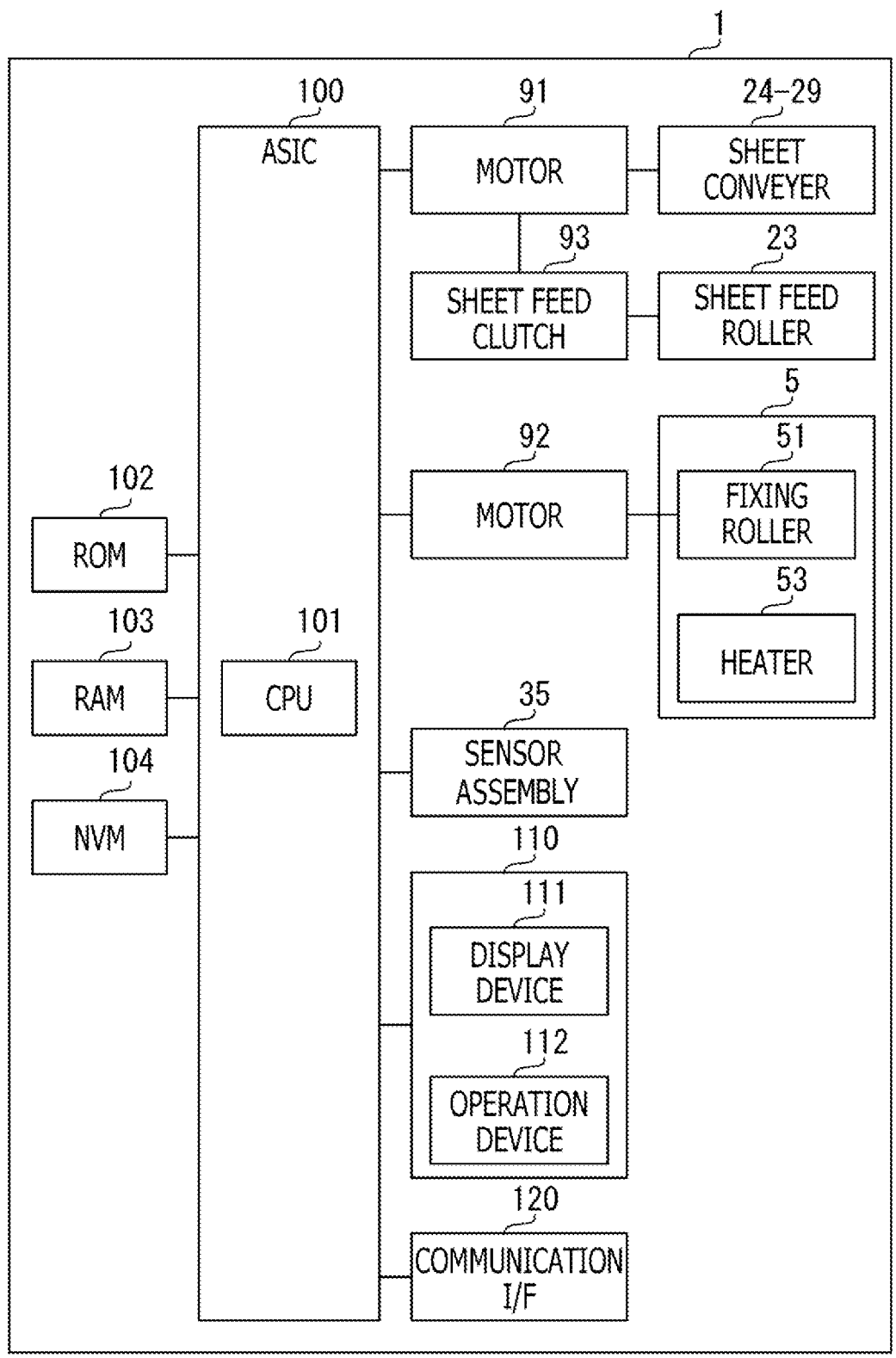
FIG. 3 is a block diagram showing an electrical configuration of the MFP.
Figure 4A:
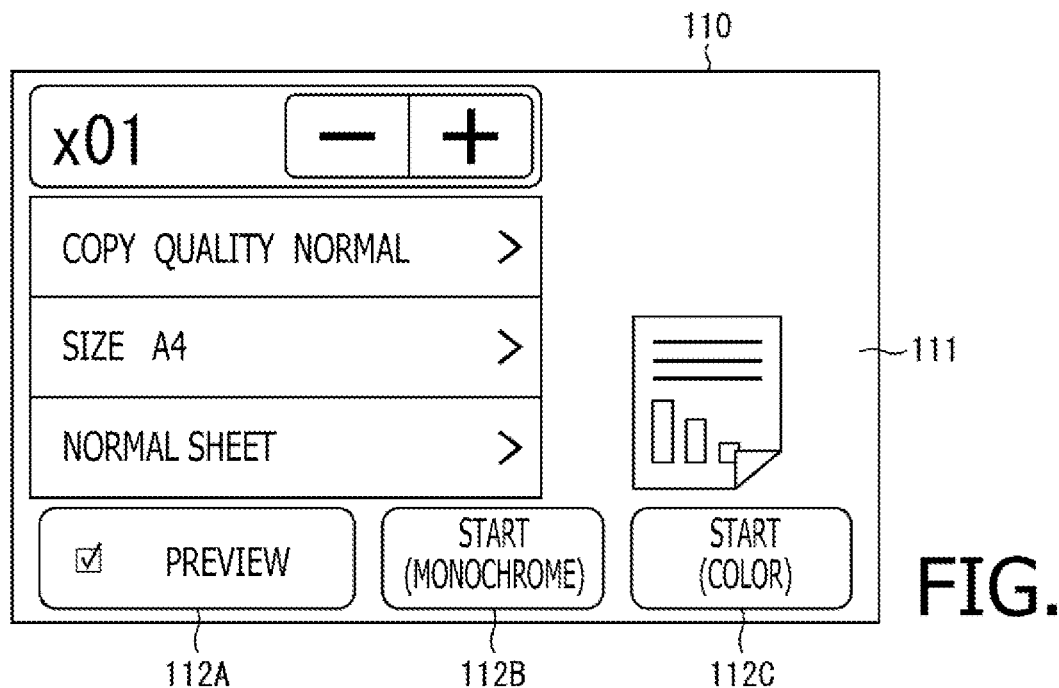
FIGS. 4A and 4B show a transition of a display screen of an operation panel of the MFP.
Figure 4B:
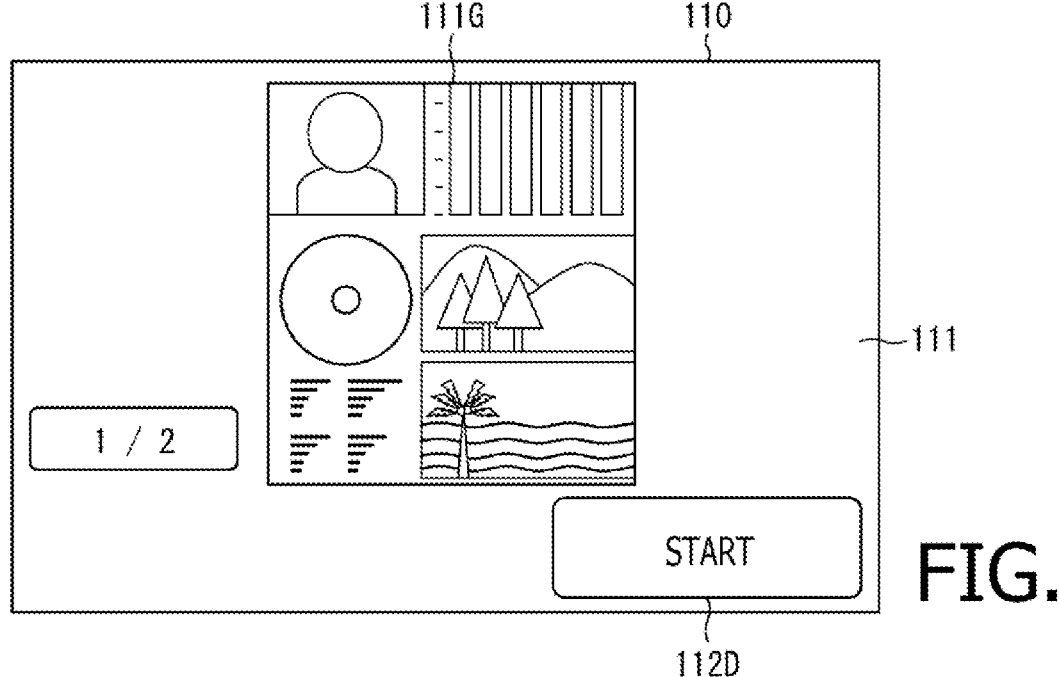

The MFP 1 has an operation panel 110 on its front side (see FIG. 1). On the operation panel 110, as shown in FIG. 3, a display device 111 and an operation device 112 are provided. The display device 111 has an LCD (liquid crystal display). The operation device 112 has, as shown in FIGS. 4A and 4B, operation keys including a preview key 112A, a monochromatic key 112B, a color key 112C, and a start key 112D.

Next, a configuration of the printer 2 will be described with reference to FIGS. 1 and 2. As shown in FIG. 1, the printer 2 has a housing 20. At a bottom part of the housing 20, a sheet feed tray 21 is provided. The sheet feed tray 21 is configured to be moved, with respect to the housing 20, in a front-rear direction. The sheet feed tray 21 is configured to accommodate multiple sheets P therein. On an upper part of the housing 20, a sheet ejection tray 22 is formed. The sheet ejection tray 22 is configured to support the sheets P on which images have been formed. According to the present embodiment, the sheet P is, for example, a normal sheet having an A4 size (210 mm×297 mm). It is noted that the printer 2 may be configured such that a plurality of sheet feed trays 21 accommodating different sizes/types of sheets are provided in accordance with the known art. Further, the number of sheet feed trays 21 the printer 2 can employ at a time may be varied.

Figure 2:
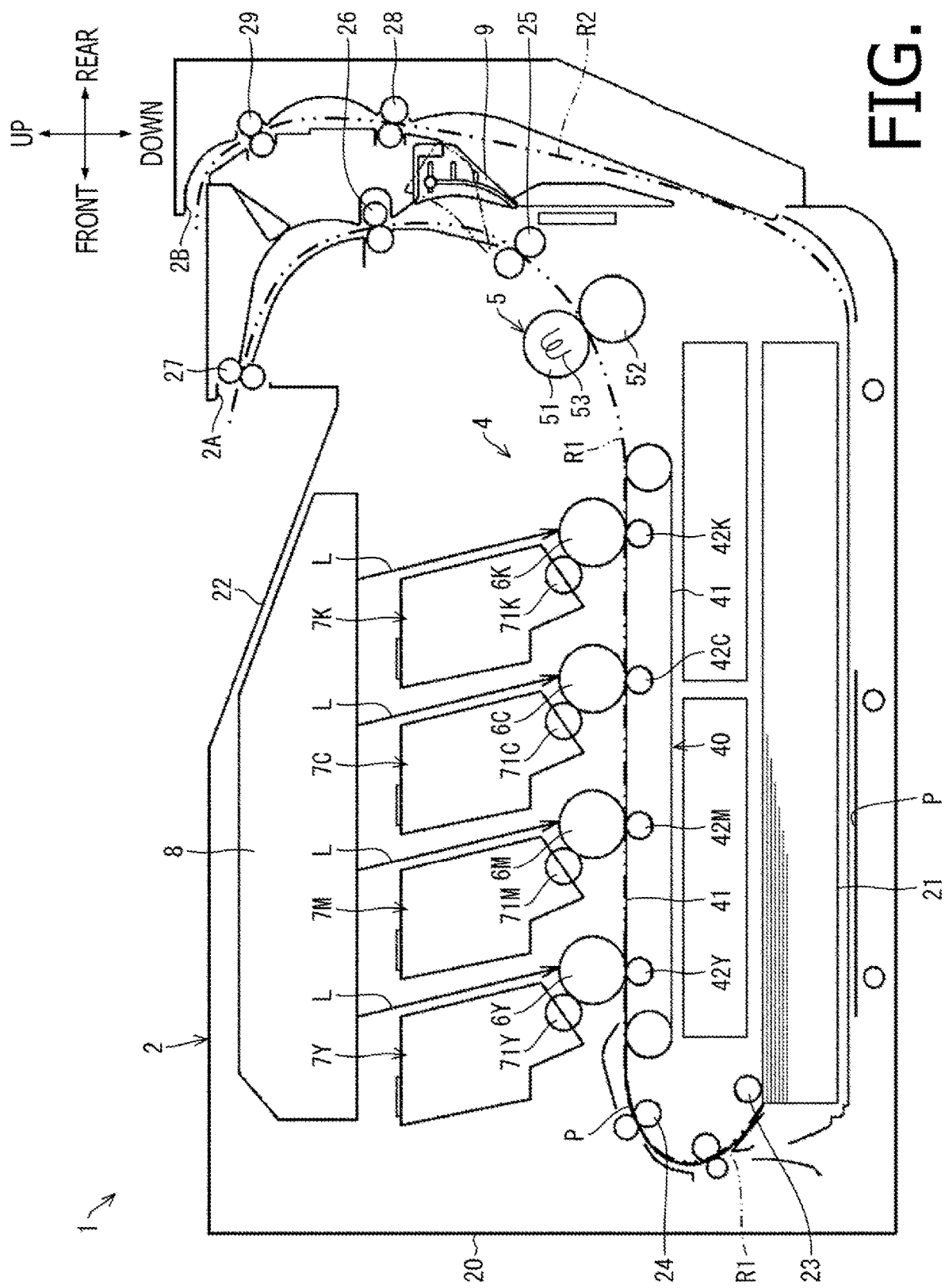
FIG. 2 is a cross-sectional side view schematically showing an internal configuration of the MFP.

FIG. 2 is a cross-sectional side view of the printer 2 of the MFP 1. As shown in FIG. 2, the printer 2 has, inside therein, a sheet feed roller 23, a sheet conveying path R1, a registration roller 24, an image formation engine 4, a fixing device 5, conveying rollers 25 and 26, a sheet ejection roller 27, a re-conveying path R2, and reversing rollers 28 and 29.

The sheet feed roller 23 is provided to the sheet feed tray 21 and is configured to feed the sheets P accommodated in the sheet feed tray 21, one by one, to a sheet conveying path R1. The sheet conveying path R1 is a path extending from the sheet feed tray 21 to the sheet ejection tray 22 via photosensitive drums 6Y, 6M, 6C and 6K, and a sheet ejection opening 2A.

The registration roller 24, the conveying rollers 25 and 26, the sheet ejection roller 27 and the reversing rollers 28 and 29 constitute a sheet conveyer configured to convey the sheet P in the sheet conveying path R1 and the re-conveying path R2. The registration roller 24 is configured to align an extending direction of a leading end of the sheet P and convey the sheet P toward the photosensitive drum 6Y.

The image formation engine 4 has a transfer device 40, four photosensitive drums 6Y, 6M, 6C, 6K, four developing devices 7Y, 7M, 7C, 7K, and an exposure device 8. The four photosensitive drums 6Y, 6M, 6C, 6K correspond to yellow (Y), magenta (M), cyan (C), and black (K) colors, and are arranged in order from the upstream side in the conveying direction of the sheet P, spaced from each other, in the front-rear direction. The photosensitive drums 6Y, 6M, 6C, 6K are driven to rotate by a driving force transmitted from a conventionally-known drive motor (not shown). The order of arrangement of the photosensitive drums 6Y, 6M, 6C, 6K is not necessarily limited to the above-described order and can be changed as needed.

The circumference surface of each of the photosensitive drums 6Y, 6M, 6C and 6K is uniformly charged by a conventionally-known charger (not shown). Four developing devices 7Y, 7M, 7C and 7K are arranged above the photosensitive drums 6Y, 6M and 6C, respectively. The developing devices 7Y, 7M, 7C, and 7K contain the toner corresponding to respective colors. The developing rollers 71Y, 71M, 71C and 71K are arranged at lower rear ends of the developing devices 7Y, 7M, 7C and 7K, respectively.

The exposure device 8 is arranged above the four developing devices 7Y, 7M, 7C and 7K. The exposure device 8 is configured to perform exposure by irradiating a laser beam to the photosensitive drums 6Y, 6M, 6C and 6K based on the image data. In this way, an electrostatic latent image corresponding to an image to be transferred onto the sheet P is formed on the surface of each of the photosensitive drums 6Y, 6M, 6C and 6K based on the image data.

The four developing rollers 71Y, 71M, 71C and 71K supply the toner to the photosensitive drums 6Y, 6M, 6C and 6K, respectively. In this way, each electrostatic latent image formed on the surface of each of the photosensitive drums 6Y, 6M, 6C and 6K turns into a developing agent image.

Below the four photosensitive drums 6Y, 6M, 6C and 6K, the transfer device 40 is arranged to extend along the front-rear direction. The transfer device 40 has an endless belt 41 and four transfer rollers 42Y, 42M, 42C and 42K. An upper surface of the belt 41 (i.e., an outer surface of an upper portion of the belt 41) moves from the front side to the rear side, with contacting the four photosensitive drums 6Y, 6M, 6C and 6K.

The four transfer rollers 42Y, 42M, 42C and 42K are spaced apart from each other in the front-rear direction. The transfer rollers 42Y, 42M, 42C and 42K are arranged below the photosensitive drums 6Y, 6M, 6C and 6K, respectively. The belt 41 is sandwiched between the transfer rollers 42Y, 42M, 42C, 42K and the photosensitive drums 6Y, 6M, 6C, 6K.

The fixing device 5 is arranged on the rear side with respect to the transfer device 40 and has a fixing roller 51 and a pressing roller 52, the fixing roller includes a heater 53. The heater 53 is an example of a heater according to aspects of the present disclosures and has, for example, a halogen heater. The heater 53 heats, through the fixing roller 51, the sheet P (i.e., the heater 53 heats the fixing roller 51 and the fixing roller heats the sheet P). Concretely, the fixing device 5 fixes the developing agent image on the sheet P as the fixing roller 51 and the pressing roller 52 apply heat and pressure to the developing agent image and the sheet P. It is noted that the heater does not have to be the heater 53 as described above, but can be any device that is configured to heat the sheet P.

The conveying roller 25 is arranged on a downstream side with respect to the fixing device 5 in the sheet conveying path R1, and is configured to convey the sheet P toward the conveying roller 26. The conveying roller 26 is configured to convey the sheet P toward the sheet ejection roller 27. The sheet ejection roller 27 is configured to eject the sheet P to the sheet ejection tray 22.

The re-conveying path R2 is a path for conveying the sheet P, on which an image has been formed on one surface thereof, from the lower side of the sheet feed tray 21 to the sheet conveying path R1 by reversing the conveying direction using the reversing rollers 28 and 29, and conveying the sheet P downward after the sheet P has been conveyed toward a passage opening 2B via a flap 9.

The flap 9 is arranged at an upper rear side with respect to the conveying roller 25, and is configured to rotate between an ejection position indicated by a solid line, at which the flap 9 opens the sheet conveying path R1 and closes the re-conveying path R2, and the re-conveying position indicated by a phantom line, at which the flap 9 closes the sheet conveying path R1 and opens the re-conveying path R2. In other words, the sheet P conveyed by the conveying roller 25 is directed to proceed along the sheet conveying path R1 when the flap 9 is located at the ejection position, while the sheet P conveyed by the conveying roller 25 is directed to the re-conveying path R2 when the flap 9 is located at the re-conveying position.

Next, a configuration of the scanner 3 will be described with reference to FIG. 1. As shown in FIG. 1, the scanner 3 has a housing 30, an ADF (auto document feeder) 31, and an original document cover 32. The ADF 31 is for automatically feeding the original document, and integrally secured to the original document cover 32. The original document cover 32 is rotatably secured to the housing 30 and is configured to open and close an upper surface of the housing 30. The scanner 3 may be configured to scan color images and monochromatic images, or only monochromatic images.

On the upper surface of the housing 30, a contact glass 33 and a contact glass 34 are arranged so as to be aligned in a width direction (i.e., the right-left direction). In the housing 30, a sensor assembly 35 shown in FIG. 3 is provided so as to be movable in the width direction, i.e., in the sub-scanning direction, or the right-left direction, below the contact glass 33 and the contact glass 34.

The sensor assembly 35 has a light source and an image sensor as in conventionally known ones. The sensor assembly 35 includes, for example, a CIS (contact image sensor). The image sensor is configured such that optical elements are arranged in a row in the main scanning direction and convert light reflected from the original document into an electrical signal for output.

In the sensor assembly 35, light emitted from the light source is irradiated onto a reading object placed on the contact glass 33 or the contact glass 34, and the light reflected by the reading object is received by the image sensor, thereby reading one line, in the main scanning direction, of image of the original document.

The scanner 3 is configured to scan images of original documents using either an FB (flatbed) method or an ADF (automatic document feeder) method. When scanning an original document using the FB method, the original document cover 32 is opened to the open position and the original document is placed on an upper surface of the contact glass 33. The original document cover 32 is then closed to the closed position. Thus, the original document is covered from the above by the original document cover 32. Then, in response to a command to execute scanning, movement of the sensor assembly 35 in the sub-scanning direction is started, and the image on the original document is read by the sensor assembly 35 while the sensor assembly 35 is moved in the sub-scanning direction.

On the other hand, when scanning an original document using the ADF method, the original document is placed on a supply tray (not shown) of the ADF 31, and the sensor assembly 35 is stopped below the contact glass 34. Thereafter, the original document is started to be conveyed by a supply roller (not shown) of the ADF in response to a command to start executing the image reading process. The sensor assembly 35 reads the surface of the original document as the original document is conveyed along the conveying path (not shown).

FIG. 3 is a block diagram showing an electrical configuration of the MFP 1. As shown in FIG. 3, the MFP 1 has an ASIC (application-specific integrated circuit) 100, a ROM (read only memory) 102, a RAM (random access memory) 103, an NVM (non-volatile memory) 104 and a communication I/F (interface) 120.

The ASIC 100 includes a CPU 101. The CPU 101 is an example of a controller according to aspects of the present disclosures and is configured to perform overall control of components of the MFP 1. The ASIC 100 is connected with the ROM 102, the RAM 103, the NVM 104, a motor 91, a motor 92, the sensor assembly 35, the operation panel 110 and the communication I/F 120. It is noted that the ASIC 100 may be configured to function as the controller instead of or in addition to the CPU 101.

The ROM 102 is configured to store various control programs and settings to control the MFP 1. The RAM 103 is used as a work area in which the various control programs read out of the ROM 102 are developed and/or as a temporary storage area in which the image data and the raster data are temporarily stored. In the NVM 104, various data including the quantity of a fixing temperature Q3 (described later) have been stored in advance. Based on the control program(s) read out from the ROM 102, the CPU 101 controls the motor 91, the motor 92, the sensor assembly 35 and the like.

The motor 91 is an example of a first driving source according to aspects of the present disclosures. The driving force of the motor 91 is transmitted to the registration roller 24, the conveying rollers 25 and 26, the sheet ejection roller 27, and the reversing rollers 28 and 29, which are included in the conveyer. Further, the driving force of the motor 91 is transmitted to the sheet feed roller 23 via a sheet feed clutch 93. The sheet feed clutch 93 is configured such that a transmission state thereof can be changed between a connected state in which the driving force of the motor 91 is supplied to the sheet feed roller 23, and a disconnected state in which the driving force of the motor 91 is not supplied to the sheet feed clutch 93. The sheet feed clutch 93 is, for example, an electromagnetic clutch.

The motor 92 is an example of a second driving source according to aspects of the present disclosures. The driving force of the motor 92 is transmitted to the fixing roller 51 of the fixing device 5 via a not-shown and well-known gear train. It is noted that the first driving source and the second driving source are not necessarily limited to the motors, but may be any other devices that are configured to move the components 24-29 of sheet conveyer and the fixing roller 51. Alternatively, the first driving source and the second driving source may be realized by a single motor that is configured to drive the sheet feed roller 23 and the fixing roller 51.

The CPU 101 is configured to control the display of the display device 111 of the operation panel 110. Further, when the operation device 112 is operated by a user, the CPU 101 performs various processes in accordance with operations of the operation device 112.

The communication I/F 120 is connected to a network such as a LAN and enables connection with an external device in which a driver for the MFP 1 has been installed. The MFP 1 is configured to receive, via the communication I/F 120, a start command to start executing the image formation process.

Figure 5A:
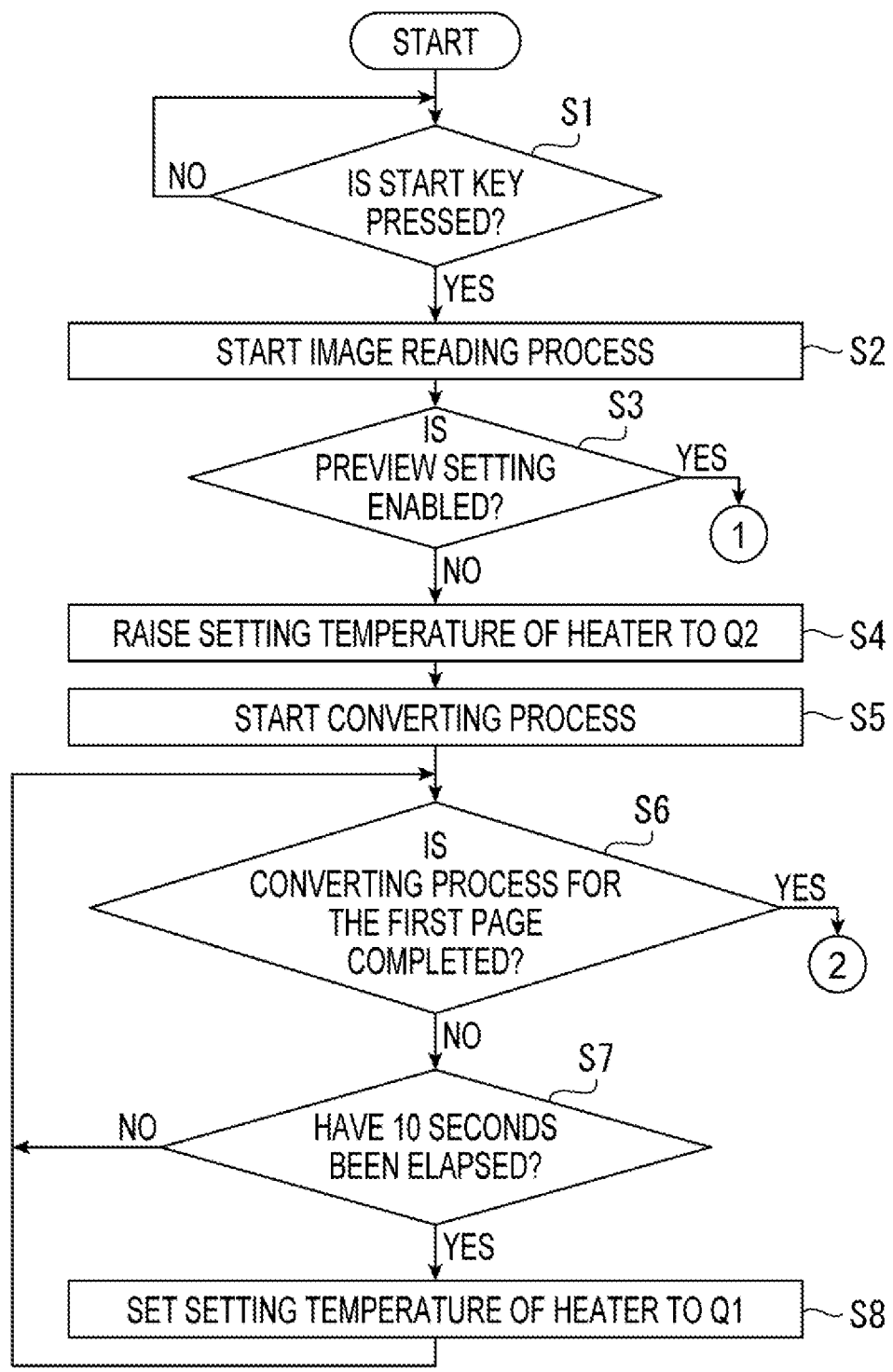
FIGS. 5A and 5B show a flowchart illustrating an image forming process performed by the MFP.
Figure 5B:
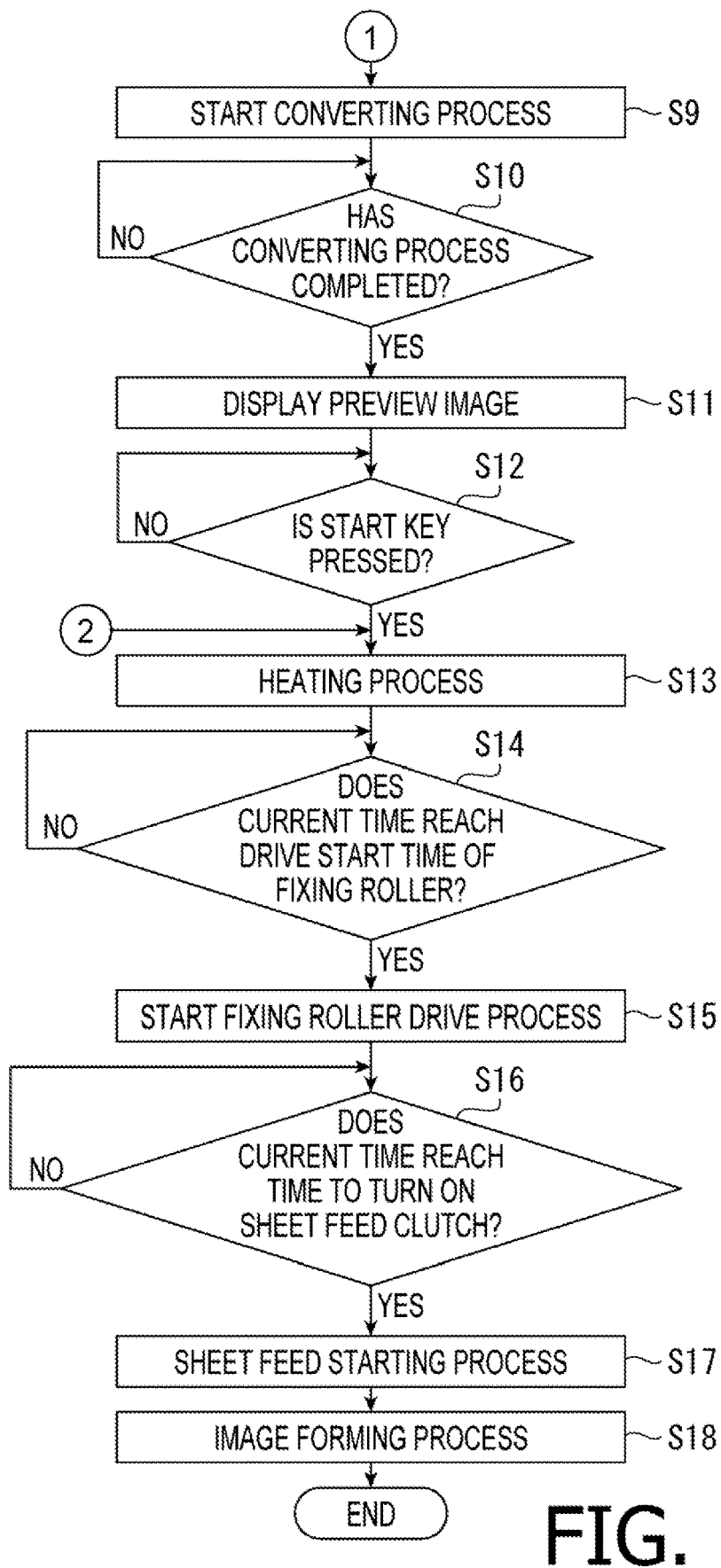
Figure 6:
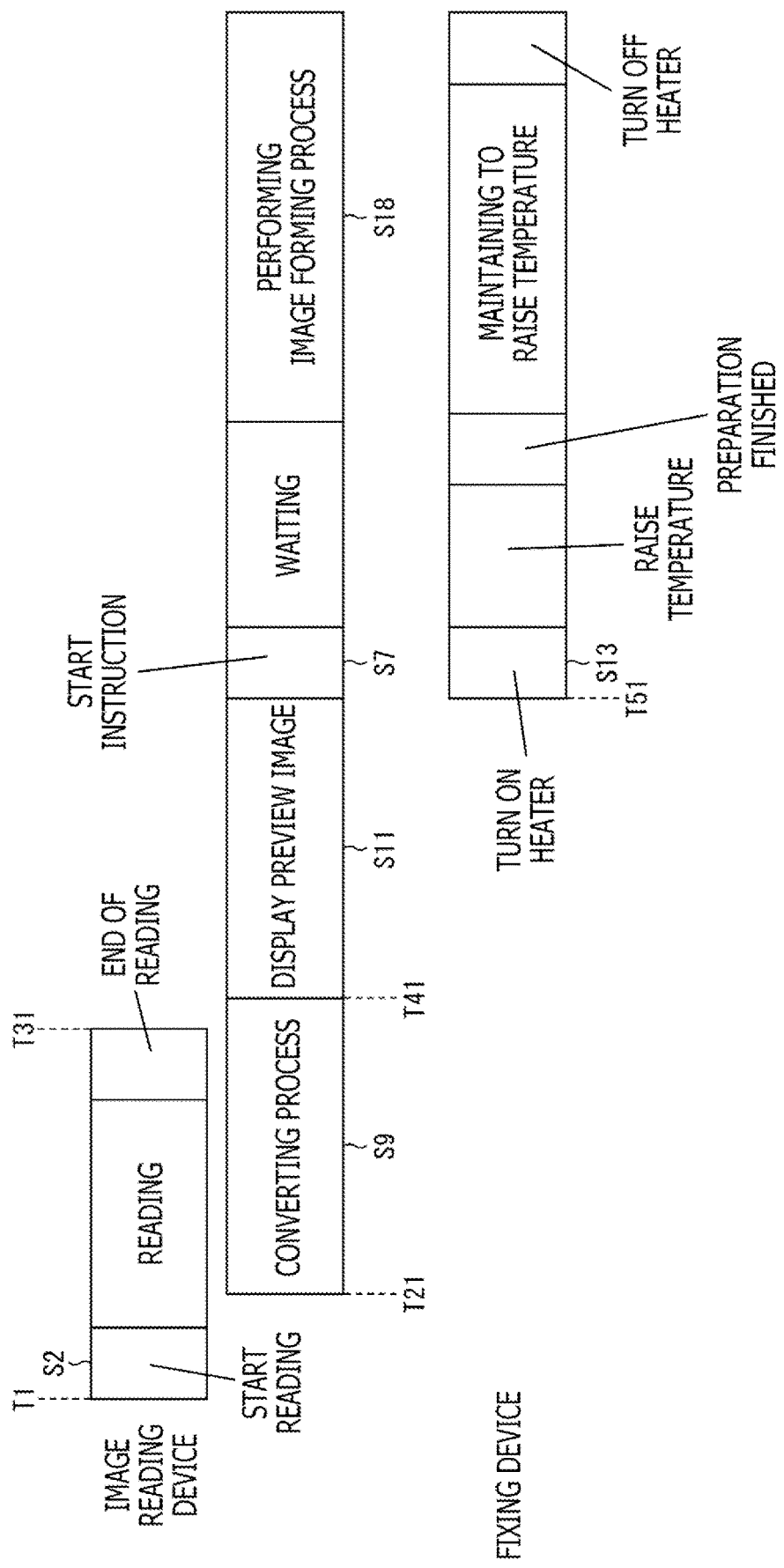
FIG. 6 illustrates operations of a scanner and a fixing device of the MFP when a preview display is enabled.

Next, a control flow of an image forming process performed by the CPU 101 will be described with reference to FIGS. 4A, 4B, 5, 6, 7A-7G and 8A-8G. FIGS. 4A and 4B show a transition of the display screen of the display device 111 of the operation panel 110. FIGS. 5A and 5B show a flowchart illustrating an image forming process of the MFP 1. The process shown in FIGS. 5A and 5B illustrate a case where the image formation is started when the MFP 1 operates in a ready mode. The "ready mode" will be described later. FIG. 6 illustrates operations of the sensor assembly 35 and the fixing device 5 of the MFP 1 when a preview display is enabled. FIGS. 7A-7G show a timing chart indicating controls of respective components of the MFP 1 when the preview display is disabled (i.e., not enabled). FIGS. 8A-8G show a timing chart indicating controls of respective components of the MFP 1 when the preview display is enabled.

According to FIGS. 5A and 5B, a case where the MFP 1 in the ready mode turns to start reading an original document and making a copy thereof is assumed. The "ready mode" is an operation mode of the MFP 1 in which the temperature of the fixing roller 51 is maintained at a first preparation temperature Q1 for a particular time period after image formation on the preceding sheet P has been completed, and waits for an instruction to execute the image formation process on a subsequent sheet P. The first preparation temperature Q1 is lower than a fixing temperature Q3, and is about 150° C. according to the present embodiment. The fixing temperature Q3 is a temperature for fixing an image (i.e., a developing agent image having been transferred on the sheet P) onto the sheet P, and is about 200° C.

In the flowchart shown in FIGS. 5A and 5B, the CPU 101 determines whether the start key 112B or start key 112C is pressed by the user (S1). The start key 112B is to be pressed when monochrome copying is to be performed, while the start key 112C is to be pressed when color copying is to be performed.

The CPU 101 repeats S1 when the start key 112B or the start key 112C is not pressed (S1: NO). When the start key 112B or the start key 112C is pressed (S1: YES), the CPU 101 starts the image reading process using the scanner 3 (S2: image reading step) at T1 (see FIG. 7A and FIG. 8A). Concretely, the CPU 101 reads the image of an original document with the sensor assembly 35 and generates scan data representing the read image. During T1-T31 of FIG. 6, the CPU 101 continuously executes the image reading process. In this embodiment, it is assumed that images of multiple sheets of the original document are read using the ADF 31. In FIGS. 7A and 8A, "P" means "being performed" and "NIP" means "not being performed."

If the preview key 112A shown in FIG. 4A has already been operated when the start key 112B or the start key 112C is pressed, the CPU 101 changes a displayed screen on the display device 111 from the screen shown in FIG. 4A to the screen shown in FIG. 4B. On the other hand, if the preview key 112A has not been operated when the start key 112B or the start key 112C is pressed, the CPU 101 does not change the displayed screen on the display device 111.

After execution of S2, the CPU 101 determines whether the preview setting is enabled (S3). As shown in FIG. 4A, by selecting the preview key 112A in advance, the preview setting to display a preview image on the display device 111 is enabled. The "preview image" is an arbitrary image appropriately corresponding to the scanned image. The preview image is, for example, only the scanned image itself. Alternatively, the preview image may be an image showing a state where the scanned image is printed on the sheet P, that is, an image composed such that the scanned image is arranged within a particular area that represents the sheet P.

When the preview setting is not enabled (S3: NO), the CPU 101 starts, in S4, raising the temperature of the heater 53 by setting the setting temperature Q of the heater 53 to a second preparation temperature Q2 at T2 (see FIG. 7E). It is noted that, in S4, the CPU 101 performs a pre-heating process to pre-heat the heater 53 so that the temperature of the heater 53 becomes the second preparation temperature Q2 which is lower than the fixing temperature Q3. The second preparation temperature Q2 is a temperature higher than the first preparation temperature Q1 and is, for example, about 170° C.

Next, the CPU 101 starts a converting process to convert the scan data of the scanned image to raster data (S5: conversion step). In the present embodiment, the scan data of multiple sheets of the original document is converted into the raster data. After the converting process is started in S5, the CPU 101 determines whether the converting process for the first page has been completed (S6).

When it is determined that the converting process for the first page has been completed (S6: YES) at T3 (see FIG. 7B) when the converting process is being performed, the CPU 101 proceeds to S13. On the other hand, when the converting process for the first page has not been determined to be completed (S6: NO), the CPU 101 repeats the determination in S6 until a particular time period (e.g., ten seconds, in this example) has elapsed, and the CPU 101 determines whether the particular time period has been elapsed (S7).

As mentioned above, until the particular time period has been elapsed (S7: NO), the CPU 101 returns to S6. When it is determined that the particular time period has been elapsed (S7: YES), the CPU 101 sets the temperature of the heater 53 to the first preparation temperature Q1 (S8) and returns to S6.

When the preview setting is enabled (S3: YES), the CPU 101 starts the converting process at T21 shown in FIG. 8B (S9 of FIG. 5B: conversion step) as is done in S5. At this stage, as shown in FIG. 8E, the temperature of the heater 53 of the fixing device 5 is not raised but maintained at the first preparation temperature Q1.

Next, the CPU 101 determines whether the converting process has been completed (S10). Until the converting process has been completed (S10: NO), the CPU 101 repeats S10. When it is determined that the converting process has been completed (S10: YES) at T41 (see FIG. 8B), the CPU 101 performs a preview display on the display device 111 (S11: displaying step). The preview display is a process of displaying a preview image 111G on the display device 111 as shown in FIG. 4B.

After execution of S11 (i.e., when the preview image is being displayed), the CPU 101 determines whether the start key 112D (see FIG. 4B) is pressed by the user (S12). When the start key 112D has not been pressed (S12: NO), the CPU 101 repeats S12. When it is determined that the start key 112D has been pressed to instruct an execution of the image forming process (S12: YES), the CPU 101 starts the heating process (S13: heating step).

In S13, the CPU 101 raises the temperature of the heater 53 to the fixing temperature Q3. Concretely, when the preview setting is not enabled, the CPU 101 raises the setting temperature of the heater 53 from the second preparation temperature Q2 to the fixing temperature Q3 at T5 (see FIG. 7E). On the other hand, when the preview setting is enabled, the setting temperature of the heater 53 is raised from the first preparation temperature Q1 to the fixing temperature Q3 at T51 (see FIG. 8E).

After execution of S13, the CPU 101 determines whether a current time has reached a drive start time of the fixing roller 51, which time has been determined in advance (S14). Until the current time reaches the drive start time of the fixing roller 51 (S14: NO), the CPU 101 repeats S14. When the current time has reached the drive start time of the fixing roller 51 (S14: YES), the CPU 101 executes a fixing roller drive start process to start driving the fixing roller 51 (S15) by driving the motor 91 to rotate at T6 (see FIG. 7F) or at T61 (see FIG. 8F).

After execution of S15, the CPU 101 determines whether the current time has reached a time to turn on the sheet feed clutch 93 (S16). Until the current time reaches the time to turn on the sheet feed clutch 93 (S16: NO), the CPU 101 repeats S16. When the current time has reached the time to turn on the sheet feed clutch 93 (S16: YES), the CPU 101 turns on the sheet feed clutch 93 at T7 (see FIG. 7G) or at T71 (see FIG. 8G). That is, the CPU 101 executes a sheet feed starting process to start rotating the sheet feed roller 23 by making the sheet feed clutch 93 be in an ON state, i.e., a transmittable state (S17). When the sheet feed roller 23 starts rotating, the sheets P accommodated in the sheet feed tray 21 are fed, one by one, to the sheet conveying path R1.

After execution of S17, the CPU 101 executes an image forming process to control the image formation engine 4 to form the developing agent image on the sheet P, and then control the fixing device 5 to fix the developing agent image on the sheet P (S18: image forming step). Concretely, the sheet P is conveyed along the sheet conveying path R1 to pass through positions between the photosensitive drums 6Y, 6M, 6C, 6K and the belt 41 in this order. At this stage, by the effects of transfer bias applied to the four transfer rollers 42Y, 42M, 42C and 42K, the developing agent images formed on the photosensitive drums 6Y, 6M, 6C and 6K are transferred on the sheet P sequentially. In this way, a color or monochromatic image based on the raster data is formed on the sheet P.

Thereafter, the sheet P is conveyed to the fixing device 5. As the sheet P passes through the nip between the fixing roller 51 and the pressing roller 52, the developing agent image is fixed onto the sheet P. In this way, an image based on the scan data is formed on the sheet P. Then, the sheet P on which the image has been formed is ejected onto the sheet ejection tray 22, and the process shown in FIGS. 5A and 5B is terminated.

In the MFP 1 described above, when the preview setting is enabled (S3: YES), the CPU 101 does not perform the pre-heating process (S4) when the preview image is being displayed as shown in FIG. 6. Accordingly, the temperature of the heater 53 is prevented from unnecessarily being raised, thereby power consumption being reduced. On the other hand, when the preview setting is disabled (S3: NO), the CPU 101 performs the heating process (S13) after the pre-heating process (S4). Therefore, in this case, a time period for the heading process (S13) can be shortened, and an FCOT (First Copy Output Time) can be shortened.

When the MFP 1 operates in the ready mode and the preview setting is enabled (S3: YES), the CPU 101 maintains the temperature of the fixing device 5 to the first preparation temperature Q1 as shown in FIG. 8F when the converting process (S9) and the displaying process (S11) are being executed, and the fixing device 5 is prevented from being heated by the heater 53 unnecessarily. On the other hand, when the preview setting is disabled (S3: NO), the CPU 101 executes the pre-heating process (S4) to pre-heat the heater 53 so that the temperature of the heater 53 is raised to the second preparation temperature Q2, and when the converting process for the first page has been completed (S6: YES), the heating process (S13) is performed immediately, thereby the FCOT being shortened.

When the converting process for the first page has not been completed (S6: NO) and the particular time period (e.g., ten seconds) has been elapsed (S7: YES) since the converting process was started (S5), the CPU 101 lowers the setting temperature of the heater 53 from the second preparation temperature Q2 to the first preparation temperature Q1. In this way, the fixing device 5 is prevented from being heated unnecessarily, and the power consumption can be reduced.

In a state where the heater 53 has been heated to the fixing temperature Q3, the CPU 101 starts rotating the fixing roller 51 (S15) before executing the sheet feed starting process (S17). In this way, the fixing device 5 is efficiently heated to reach the fixing temperature Q3 before the sheet P is conveyed to the fixing device 5.

Figure 9A:
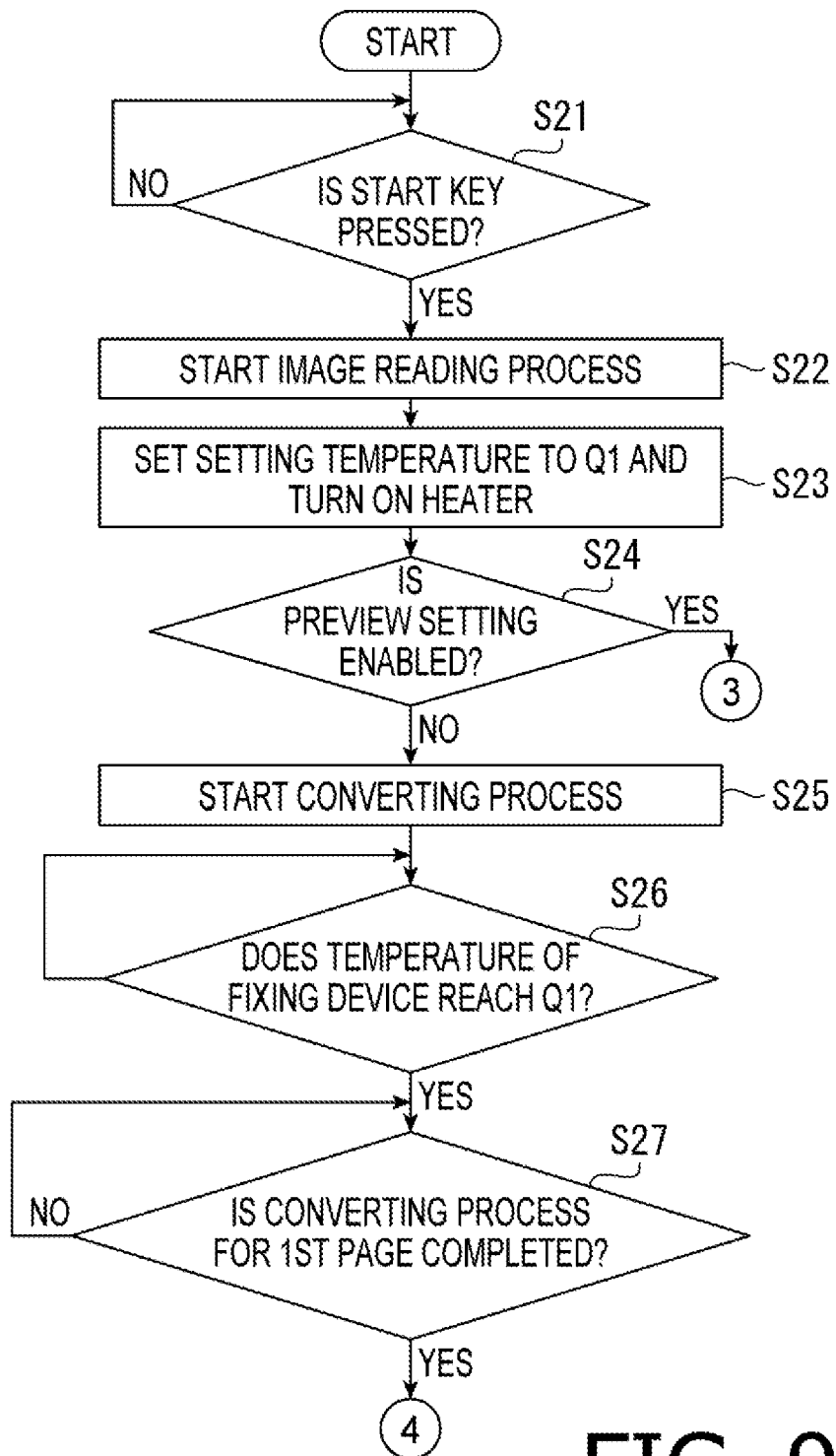
FIGS. 9A and 9B show a flowchart illustrating an image forming process performed by the MFP according to a modified embodiment.
Figure 9B:
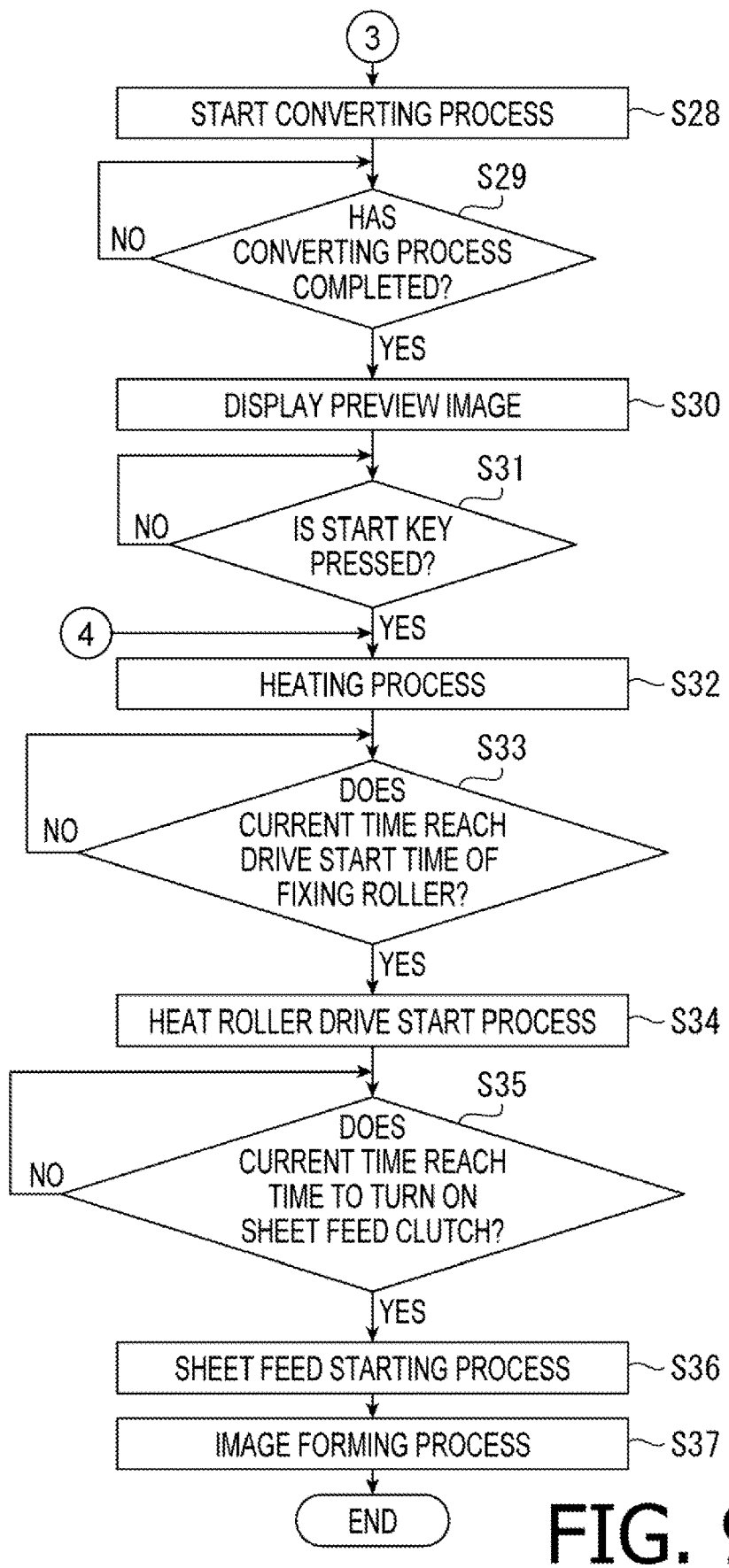

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Hereinafter, a modified configuration of the MFP 1 will be described with reference to FIGS. 9A, 9B, 10A-10G and 11A-11G. FIGS. 9A and 9B show a flowchart illustrating an image forming process of the MFP 1 with the modified configuration. FIGS. 10A-10G show a timing chart illustrating control of components of the MFP 1 when the preview display is disabled. FIGS. 11A-11G show a timing chart illustrating control of the components of the MFP 1 when the preview display is enabled. For the sake of description, members having the same functions as those of the MFP 1 according to the above-described embodiment are indicated with the same reference symbols/numerals, and their descriptions will not be repeated.

According to the present embodiment, it is assumed that the MFP 1 operating in a sleep mode is controlled to operate in an operable mode, read an image formed on an original document, and make a copy of the read image. It is noted that, after a particular period of time (e.g., ten minutes) has elapsed after the image forming process has been completed, the operating mode of the MFP 1 is switched to the "sleep mode" in which the heater 53 is set to an OFF state. Therefore, it is assumed that the temperature of the heater 53 is a room temperature when the MFP 1 operates in the sleep mode.

In the flowchart shown in FIGS. 9A and 9B, the CPU 101 firstly determines whether the start key 112B or 112C is pressed by the user (S21). When the start key 112B or the start key 112C is not pressed (S21: NO), the CPU 101 repeats S21. When it is determined that the start key 112B or 112C has been pressed (S21: YES), the CPU 101 controls the scanner 3 to start an image reading process at T1 (FIG. 10A, FIG. 11A) (S22: image reading step).

Next, the CPU 101 turns on the heater 53 with the setting temperature being set to the first preparation temperature Q1 at T22 (see FIG. 10D) or at T23 (see FIG. 11D) (S23). Then, the CPU 101 determines whether the preview setting is enabled (S24). When it is determined that the preview setting is disabled (S24: NO), the CPU 101 starts the converting process (S25: converting step).

After execution of S25 (after the converting process is started), the CPU 101 determines whether the temperature of the fixing device 5 has reached the first preparation temperature Q1 (S26). Until the temperature of the fixing device 5 reaches the first preparation temperature Q1 (S26: NO), the CPU 101 repeats S26. When the temperature of the fixing device 5 reaches the first preparation temperature Q1 (S26: YES), the CPU 101 determines whether the converting process for the first page has been completed (S27).

Until the converting process for the first page is completed (S27: NO), the CPU 101 repeats S27. When it is determined that the converting process for the first page has been completed at T32 (see FIG. 10B) (S27: YES), the CPU 101 proceeds to S32 (see FIG. 9B).

On the other hand, when the preview setting is enabled (S23: YES), the CPU 101 starts the converting process (S28 of FIG. 9B: converting step). After execution of S28 (i.e., after starting the converting process), the CPU 101 determines whether the converting process has been completed (S29). Until the converting process is completed (S29: NO), the CPU 101 repeats S29. When the converting process has been completed (S29: YES), the CPU 101 displays a preview image on the display device 111 (S30: displaying step).

After execution of S30, the CPU 101 determines whether the start key 112D shown in FIG. 4B is pressed by the user (S31). When it is determined that the start key 112D has not been pressed (S31: NO), the CPU 101 repeats S31. When it is determined that the start key 112D has been pressed (S31: YES), the CPU 101 proceeds to S32.

In S32, the CPU 101 sets the setting temperature of the heater 53 to the fixing temperature Q3. Concretely, when the preview setting is disabled, the CPU 101 changes the setting temperature of the heater 53 from the first preparation temperature Q1 to the fixing temperature Q3 at T52 (see FIG. 10E). On the other hand, when the preview setting is enabled, the CPU 101 changes the setting temperature of the heater 53 from the first preparation temperature Q1 to the fixing temperature Q3 at T53 (see FIG. 11E).

After execution of S32, the CPU 101 determines whether the current time has reached the drive start time of the fixing roller 51 (S33). Until the current time reaches the drive start time of the fixing roller 51 (S33: NO), the CPU 101 repeats S33.

When the current time reaches the drive start time of the fixing roller 51 (S33: YES), the CPU 101 executes the roller drive start process to start driving the fixing roller 51 by controlling the motor 91 to rotate at T62 (see FIG. 10F or at T63 (see FIG. 11F) (S34). After execution of S34, the CPU 101 determines whether the current time has reached a time to turn on the sheet feed clutch 93 (S35).

Until the current time has reached the time to turn on the sheet feed clutch 93 (S35: NO), the CPU 101 repeats S35. When the current time has reached the time to turn on the sheet feed clutch 93 (S35: YES), the CPU 101 turns on the sheet feed clutch at T72 (see FIG. 10G) or at T73 (see FIG. 11G). In this way, by setting the sheet feed clutch 93 to the transmittable state (i.e., in the ON state), the CPU 101 executes the sheet feed starting process to start rotating the sheet feed roller 23 (S36). When the sheet feed roller 23 starts rotating, the sheets P accommodated in the sheet feed tray 21 are fed, one by one, to the sheet conveying path R1.

After execution of S36 (i.e., after starting rotating the sheet feed roller 23), the CPU 101 executes the image forming process (S37: image forming step) as is done in S18. In this way, the flow shown in FIGS. 9A and 9B is terminated.

According to the modified embodiment described above, when the MFP 1 operates in the sleep mode and the preview setting is enabled (S24: YES), the CPU 101 maintains the temperature of the fixing device 5 to the first preparation temperature Q1, thereby the fixing device 5 be prevented from being heated unnecessarily by the heater 53.

When the MFP 1 operates in the sleep mode and the preview setting is disabled (S24: NO), the CPU 101 starts the heating process (S32) at a timing when the temperature of the fixing device 5 has reached the first preparation temperature Q1 as the pre-heating process is performed (S26: YES). In this way, the heating process (S32) can be shortened, and thus the FCOT can be shortened.

In each of the MFP 1 and its modification described above, the fixing device 5 is configured to include the fixing roller 51, the heater 53 for raising the temperature of the fixing roller 51, and the pressing roller 52. However, the configuration is not necessarily limited to the above. For example, the fixing device 5 may be configured to have a heater, a nip plate configured to receive radiant heat from the heater, a heating belt that rotates around the nip plate, and a pressing roller.

The fixing device 5 may be provided with a substrate on which a heat generation pattern is provided, a belt rotating around the substrate, and a pressing roller, and the substrate and the belt may be in contact with each other. Further, the fixing device 5 may be configured to have a fixing roller, a heater configured to raise the temperature of the fixing roller, and a pressing belt.

In the above description, the sheet P is assumed to be the normal sheet. However, the type of the sheet P is not necessarily limited to the normal sheet, but can be a thick sheet or a thin sheet. Further, the quantity of the fixing temperature Q3 may be varied depending on the type of the sheet P. That is, the MFP 1 may be configured such that the thicker the thickness of the sheet P is, the higher the fixing temperature Q3 is.

In the MFPs 1 described above, when the preview setting is enabled, the heating process (S13, S32) is performed in response to the start key 112D being pressed. However, the configuration is not necessarily limited to such a configuration. In addition to the above configuration, the heating process may be started in response to the sheet P being fed by the sheet feed roller 23 and/or in response to the detection of the passage of the sheet P by a sheet sensor (not shown) arranged on the sheet conveying path R1 on the upstream side with respect to the registration roller 24.

In the embodiments described above, a case where multiple sheets of the original document are read with use of the ADF 31 is described. In addition to such a configuration, an image of a single sheet of an original document placed on the upper surface of the contact glass 33 may be read by the sensor assembly 35 and the read image may be formed on the sheet P.

It is noted that the control block (in particular, the CPU 101) of the MFP 1 may be realized by hardware (e.g., logical circuits configured as an integrated circuit such as an IC chip), or by software containing computer-executable instructions.

In the latter case, the MFP 1 may be equipped with a computer configured to execute instructions of a program, which is software that implements each function. Such a computer may be equipped with one or more processors, and a non-transitory computer-readable recording medium configured to store the program. Then, in the computer, the processor may read the program from the recording medium and execute the same, thereby achieving respective functions.

As the processor mentioned above, a CPU (Central Processing Unit) can be used, for example. As the recording medium, a "non-transitory tangible medium," such as a ROM (Read Only Memory), a tape, a disk, a card, a semiconductor memory and/or a programmable logic circuit may be used. The MFP 1 may further be provided with a RAM (Random Access Memory) in which the above program is developed.

The above program may be supplied to the computer via any transmission medium (e.g., a communication network, a broadcast wave, or the like) capable of transmitting the program. It is noted that aspects of the present disclosures may be realized in a form of a data signal, which realizes the program by electronic transmission, embedded in a carrier wave.

The present disclosures are not necessarily limited to the above-described embodiments, but various modifications may be made within the scope of the claims. It is also noted that embodiments obtained by combining technical means disclosed respectively in different embodiments as appropriate are also included in the technical scope of the present disclosures.

What is claimed is:

1. An image forming apparatus, comprising:
   a conveyer having a sheet conveying roller configured to convey a sheet;
   an image formation engine configured to form a developing agent image on the sheet conveyed by the conveyer;
   a fixing device having a heater configured to apply heat to the sheet, the fixing device being configured to fix the developing agent image on the sheet;
   a sensor assembly configured to read an image on an original document;
   a display device configured to display an image; and
   a controller including hardware,
   wherein the controller is configured to perform:
     reading an image of the original document with use of the sensor assembly;
     determining whether a preview setting to display a preview image that corresponds to the read image on the display is enabled or disabled;
     when the preview setting is disabled, performing a pre-heating the heater to heat the fixing device to a temperature lower than a fixing temperature to fix the image onto the sheet;
     when the preview setting is enabled, displaying the preview image on the display without performing the pre-heating of the heater to heat the fixing device;
     raising a temperature of the fixing device so that the temperature is the fixing temperature;
     forming the developing agent image on the sheet with the image formation engine after performing the raising of the temperature to the fixing temperature; and
     fixing the developing agent image on the sheet with the fixing device.

2. The image forming apparatus according to claim 1, further comprising:
   a first drive source;
   a second drive source;
   a sheet feed roller configured to feed a sheet; and
   a sheet feed clutch of which status is switchable between a connected state in which a drive force of the first drive source is transmitted to the sheet feed roller and a disconnected state in which the drive force of the first drive source is not transmitted to the sheet feed roller, wherein the fixing device comprises a fixing roller configured to be driven to rotate by the second drive source, wherein the controller is configured to perform:
- driving the fixing roller by driving the second drive source after starting the raising of the temperature of the fixing device to the fixing temperature; and
- starting rotation of the feed roller by setting the status of the clutch to the connected state after starting the driving the fixing roller.

* * * * *